S. H. BAKER.
Food-Steamer.
No. 216,717. Patented June 24, 1879.
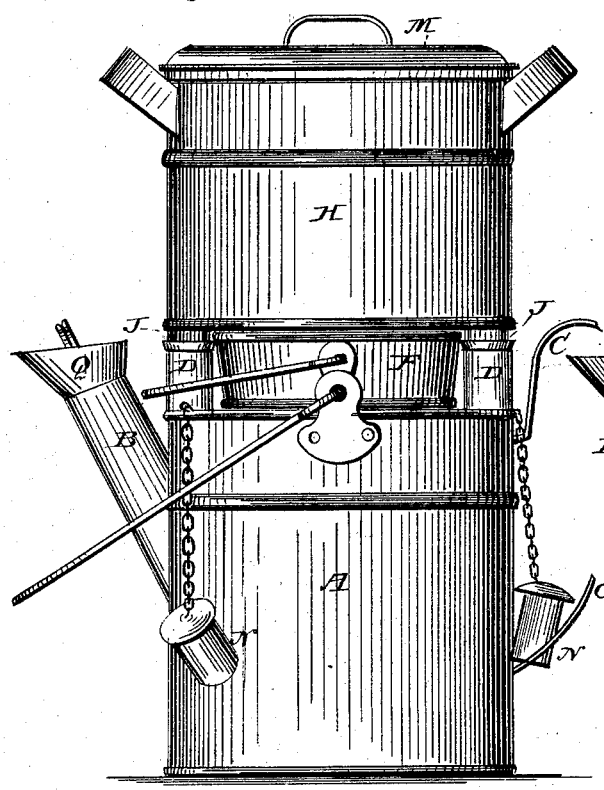
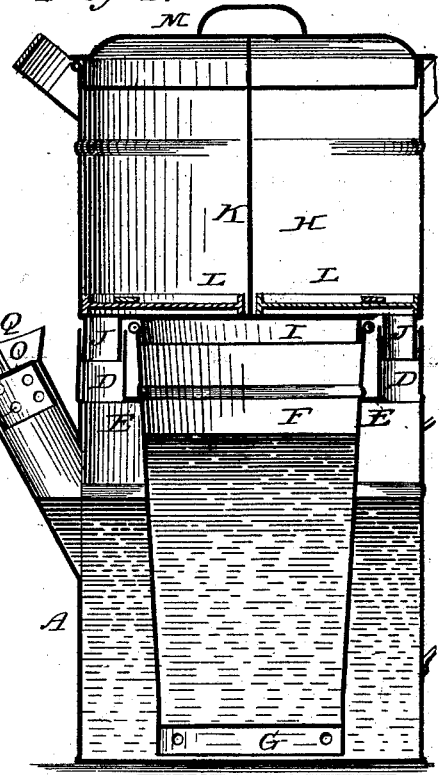
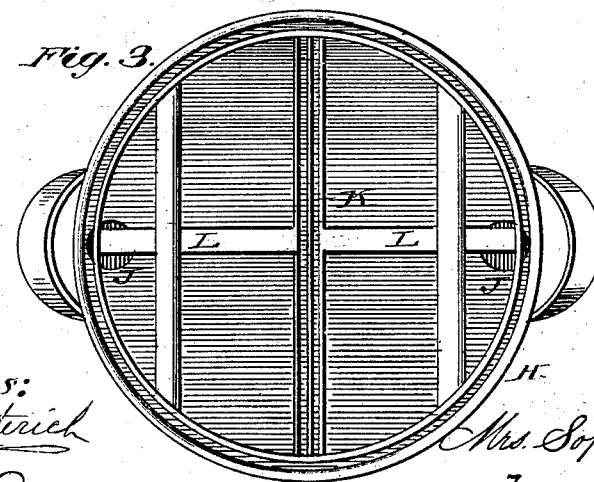

UNITED STATES PATENT OFFICE.

SOPHIA H. BAKER, OF WILMINGTON, ILLINOIS.

IMPROVEMENT IN FOOD-STEAMERS.

Specification forming part of Letters Patent No. 216,717, dated June 24, 1879; application filed March 14, 1879.

*To all whom it may concern:*

Be it known that I, Mrs. SOPHIA H. BAKER, of Wilmington, in the county of Will and State of Illinois, have invented certain new and useful Improvements in Food Steamer and Boiler; and I do hereby declare that the following is a full, clear, and exact description of the invention, which will enable others skilled in the art to which it appertains to make and use the same, reference being had to the accompanying drawings, which form a part of this specification.

Figure 1 is a side view. Fig. 2 is a vertical section; and Fig. 3 is a top view, the cover having been removed.

Corresponding parts in the several figures are denoted by like letters of reference.

This invention relates to cooking utensils; and it consists in an improved apparatus for boiling and steaming puddings, custards, vegetables, &c., the construction of which will be hereinafter more fully described, and particularly pointed out in the claim.

In the drawings, A represents a kettle or vessel, having spout B, handle C, and provided with a top rim, E, from which two tubes, D D, arranged on diametrically opposite sides, project in an upward direction. A vessel, F, is arranged in the kettle A, said vessel being fitted in the rim E, and provided with a perforated flange, G, extending downwardly from its bottom, to support it upon the bottom of kettle A and admit of the free circulation of water. H is a vessel, the bottom of which is provided with a flange, I, fitting in vessel F, and two tubes, J J, fitting in the tubes D D of kettle A. A removable partition, K, divides the vessel H into two compartments, each of which is provided with a bottom frame, L, upon which vegetables may be supported while being steamed, thus preventing the tubes J from being covered or clogged up, so as to prevent the admission of steam from the kettle A. A cover, M, is provided for the vessel H. Caps N N are attached to vessel A, for the purpose of closing the tubes D D when the vessel H is not in use. A suitable cover may then also be provided for the vessel F. A cap, O, provided with ventilating-openings P, is attached to the spout B. Said spout terminates in a funnel, Q, through which the water in kettle A may at any time be easily replenished.

In operation, puddings, custards, &c., to be cooked may be placed in the vessel F, the sides and bottom of which are surrounded by water, so as to prevent scorching of the contents. Vegetables to be steamed may at the same time be placed in the vessel H, into which steam is admitted through the tubes D J, which also conduct the liquor back into the kettle A, without danger of interfering with the contents of vessel F.

When the partition K is used, two kinds of vegetables may be steamed at the same time without either being flavored by the other. By adjusting the cap O the pressure of steam may be properly regulated.

My improved apparatus is simple, convenient, and may be manufactured at a small expense.

Having thus described my invention, I claim and desire to secure by Letters Patent of the United States—

As an improvement in culinary utensils, the kettle A, having tubes D D, vessel F, having perforated flange G, and vessel H, having tubes J J, flange I, removable partition K, and bottom frames, L L, all combined and operating substantially as and for the purpose herein shown and specified.

In testimony that I claim the foregoing as my own I have hereto affixed my signature in presence of two witnesses.

SOPHIA HUSSEY BAKER.

Witnesses:
 JOHN M. BAKER,
 ADALINE E. HOLMES.